US012746832B2

(12) United States Patent
McGowan et al.

(10) Patent No.: US 12,746,832 B2
(45) Date of Patent: Sep. 29, 2026

(54) SELECTING SECOND LIFE BATTERY FOR ELECTRIC TRACTORS

(71) Applicant: TOYOTA MOTOR ENGINEERING & MANUFACTURING NORTH AMERICA, INC., Plano, TX (US)

(72) Inventors: Allison McGowan, Ann Arbor, MI (US); Adam Muehlhauser, Ann Arbor, MI (US); Matthew James Dula, Saline, MI (US); Rudra Sanjiv Mehta, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 397 days.

(21) Appl. No.: 18/523,281

(22) Filed: Nov. 29, 2023

(65) Prior Publication Data

US 2025/0170908 A1 May 29, 2025

(51) Int. Cl.

*B60L 50/60* (2019.01)
*B60L 58/16* (2019.01)
*H01M 10/0525* (2010.01)
*H01M 10/30* (2006.01)

(52) U.S. Cl.

CPC ............... *B60L 50/66* (2019.02); *B60L 58/16* (2019.02); *H01M 10/0525* (2013.01); *H01M 10/30* (2013.01); *B60L 2200/40* (2013.01); *H01M 2220/20* (2013.01)

(58) Field of Classification Search

CPC ...... B60L 50/66; B60L 58/16; B60L 2200/40; H01M 10/0525; H01M 10/30; H01M 2220/20

See application file for complete search history.

(56) References Cited

U.S. PATENT DOCUMENTS

| | | | | |
|---|---|---|---|---|
| 9,397,374 | B2 | 7/2016 | Yamauchi | |
| 10,518,831 | B2 | 12/2019 | Wright | |
| 11,289,921 | B1 * | 3/2022 | Hall | H02J 7/575 |
| 11,505,265 | B2 | 11/2022 | Lee | |
| 11,598,818 | B2 | 3/2023 | Hascoat | |

(Continued)

FOREIGN PATENT DOCUMENTS

| | | | |
|---|---|---|---|
| EP | 1786057 | A2 | 5/2007 |
| EP | 3916884 | A1 | 12/2021 |

(Continued)

OTHER PUBLICATIONS

John Deere, Electric Equipment, retrieved from Internet https://www.deere.com/en/electric-equipment/ Nov. 29, 2023, 6 pages.

(Continued)

*Primary Examiner* — Edwin A Young
(74) *Attorney, Agent, or Firm* — HAYNES AND BOONE, LLP

(57) ABSTRACT

The systems, devices, and methods described herein relate to producing or selecting a second-life battery that would be unsuitable for an electric vehicle but suitable for use with a tractor or other work vehicle. The second-life battery may be integrated into the tractor or a trailer connected to the tractor and provide electrical power to the tractor.

20 Claims, 5 Drawing Sheets

(56) References Cited

U.S. PATENT DOCUMENTS

| | | | | |
|---|---|---|---|---|
| 11,712,977 | B2 | 8/2023 | Bucknor | |
| 2017/0355269 | A1* | 12/2017 | An | B60L 58/20 |
| 2018/0034114 | A1* | 2/2018 | Hinterberger | H01M 10/488 |
| 2018/0134174 | A1 | 5/2018 | Jang | |
| 2021/0111384 | A1 | 4/2021 | Zeiler | |
| 2022/0032806 | A1 | 2/2022 | Christensen | |
| 2022/0149451 | A1 | 5/2022 | Burchardt | |
| 2022/0149630 | A1 | 5/2022 | Burchardt | |
| 2022/0209546 | A1* | 6/2022 | Hall | H02J 7/575 |
| 2022/0329081 | A1 | 10/2022 | Bentzion | |
| 2022/0404426 | A1 | 12/2022 | Karner | |
| 2022/0416312 | A1 | 12/2022 | Zeiler | |
| 2023/0054789 | A1 | 2/2023 | Zeiler | |
| 2023/0072285 | A1 | 3/2023 | Zeiler | |
| 2023/0145383 | A1 | 5/2023 | Salter | |
| 2023/0180657 | A1* | 6/2023 | Zeiler | A01D 69/02 56/13.6 |
| 2023/0311682 | A1* | 10/2023 | Moore | B60L 53/50 180/65.31 |

FOREIGN PATENT DOCUMENTS

| | | | |
|---|---|---|---|
| JP | 7182476 | B2 | 12/2022 |
| WO | 2021082475 | A1 | 5/2021 |

OTHER PUBLICATIONS

Nick Gibbs, French startup uses battery trailers to cure EV range angst, Automotive News Europe, Feb. 19, 2020, 8 pages, https://europe.autonews.com/blogs/french-startup-uses-battery-trailers-cure-ev-rangeangst.

Emanuele Michelini et al., Potential and Most Promising Second-Life Applications for Automotive Lithium-Ion Batteries Consiering Technical, Economic and Legal Aspects, Energies 2023, 16, 2830, 21 pages, https://doi.org/10.3390/en16062830.

Carlos Antonio Rufino Junior et al., Towards a business model for second-life batteries—barriers, opportunities, uncertainties, and technologies, Journal of Energy Chemistry (2022), 80 pages, doi: https//doi.org/1.1016/j.jechem.2022.12.019.

* cited by examiner

SELECTING SECOND LIFE BATTERY FOR ELECTRIC TRACTORS

TECHNICAL FIELD

The present disclosure is directed to systems, devices, and methods for providing power to a tractor or other agricultural vehicle using second-life batteries previously used with electric vehicles. The second-life batteries may be unsuitable for use with electric vehicles but still have utility to provide power to tractors.

BACKGROUND OF THE DISCLOSURE

The advent of new battery cell technologies has led to the widespread use of electric vehicles. These vehicles have electric motors that are powered by electric batteries, such as lithium-ion batteries. During use, electric vehicle batteries are subject to a variety of conditions including heat and chemical wear that leads to degradation. Over time, these batteries become unsuitable for use in electric vehicles and must be replaced.

Since the batteries of an electric vehicle represent a large amount of its value, the requirement to replace batteries is very costly. In particular, the disposal of these batteries may represent a large amount of value lost. Many of these batteries also contain hazardous materials including heavy metals and acids, making their disposal dangerous and hazardous to the environment.

As electric vehicles become more widespread, battery technology has become increasingly useful in other fields, such as agriculture. Electric and hybrid electric work vehicles, including tractors, are useful for a variety of tasks. However, just as in other electric vehicles, the use and replacement of batteries represents a large cost of electric or hybrid-electric tractors.

Thus, there is a need in the art for systems and methods to reduce the disposal costs of electric vehicle batteries and recapture utility and value from batteries that are no longer suitable for use in electric vehicles.

SUMMARY

In some example aspects, the present disclosure introduces a method for providing power for a tractor, which may include: selecting a second-life battery by: providing a plurality of vehicle batteries; conducting a state-of-health (SOH) test on each of the plurality of vehicle batteries; comparing a SOH result value for each of the SOH tests to a target SOH range, the target SOH range being below an acceptable SOH value for powering an electric vehicle and above an acceptable SOH value for powering a tractor; and selecting a first second-life battery of the plurality of vehicle batteries with a SOH result being within the target SOH range; positioning the first second-life battery near a tractor; and providing power to the tractor from the first second-life battery through an electrical connection.

In some implementations, the method includes positioning the first second-life battery on a trailer that is electrically connected to the tractor. The method may include selecting a second second-life battery of the plurality of vehicle batteries with a SOH result being within the target SOH range. The method may include comprising positioning the second second-life battery near the tractor and electrically connected to the first second-life battery; and providing power to the tractor from the second second-life battery through the electrical connection.

In some implementations, the method also includes positioning the first second-life battery and the second second-life battery on a trailer that is electrically connected to the tractor. The tractor may be a fully electric tractor or a hybrid-electric tractor. Providing power to the tractor from the first second-life battery through an electrical connection may be in addition to another power supply being used on the tractor.

A system for providing power to a tractor with a second-life battery is also provided, which may include: a testing system configured to: define a target state-of-health (SOH) range, the target SOH range being below an acceptable SOH value for powering an electric vehicle and above an acceptable SOH value for powering a tractor; conduct SOH testing on a plurality of second-life batteries previously used on electric vehicles; select a first second-life battery from the plurality of second-life batteries that meets the target SOH range; and a trailer configured to hold the selected first second-life battery, the trailer having an electrical connection to the tractor to provide power from the selected first second-life battery to the tractor.

In some implementations, the testing system is further configured to select a second second-life battery from the plurality of second-life batteries that meets the target SOH range. The trailer may be configured to provide power to the tractor from the second-life battery through the electrical connection. The tractor may be a fully electric tractor or a hybrid-electric tractor. The trailer may be configured to provide power from the selected first second-life battery to the tractor through the electrical connection in addition to another power supply being used on the tractor. The target SOH range may have an upper limit of 90% and a lower limit of 70% of normal operating battery health. The target SOH range may have an upper limit of 95% and a lower limit of 60% of normal operating battery health. The second-life battery may be a lithium ion battery, a nickel-metal hydride battery, a solid-state battery, a sodium battery, or other type of battery.

A method for providing a second-life battery for use with a tractor is also provided, which may include: providing a vehicle battery comprising a plurality of battery cells; determining a target state-of-health (SOH) range, the target SOH range having as a lower limit an acceptable SOH value for powering a tractor and having as an upper limit an acceptable SOH value for powering an electric vehicle; conducting a SOH test on each of the plurality of battery cells; comparing a SOH result value for each of the SOH tests to the target SOH range; selecting one or more battery cells with a SOH result value that falls within the target SOH range; removing the selected one or more battery cells from the vehicle battery; repackaging the selected one or more battery cells in a second-life battery; and using the second-life battery to provide power to a tractor.

In some implementations, the target SOH range has an upper limit of 90% and a lower limit of 70% of normal operating battery health.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for utilizing second-life batteries. In particular, the present disclosure describes systems and methods for selecting second-life batteries that are unsuitable for use in electric vehicles but still have utility for powering work vehicles such as tractors. These second-life batteries may be incorporated in a trailer connected to such a tractor to provide extended range or provide additional power for certain maneuvers. The second-life battery could also replace the location of a traditional engine in the front of the tractor. These systems and methods provide various benefits and advantages such as recapturing value from electric vehicle batteries, reducing costs associated with removal and disposal of these batteries, and avoiding environmental damage associate with battery disposal. Further, these systems and methods may provide a cost-effective solution for providing power to work vehicles that is easily to install and ideal for agricultural applications.

An exemplary system includes one or more second-life batteries that may be repackaged or used with a trailer to provide additional power to a tractor or other work vehicle. The second-life battery may be used in an array (optionally including other second-life batteries connected together) and may be used as a primary or second source of power for the tractor.

Figure 1:
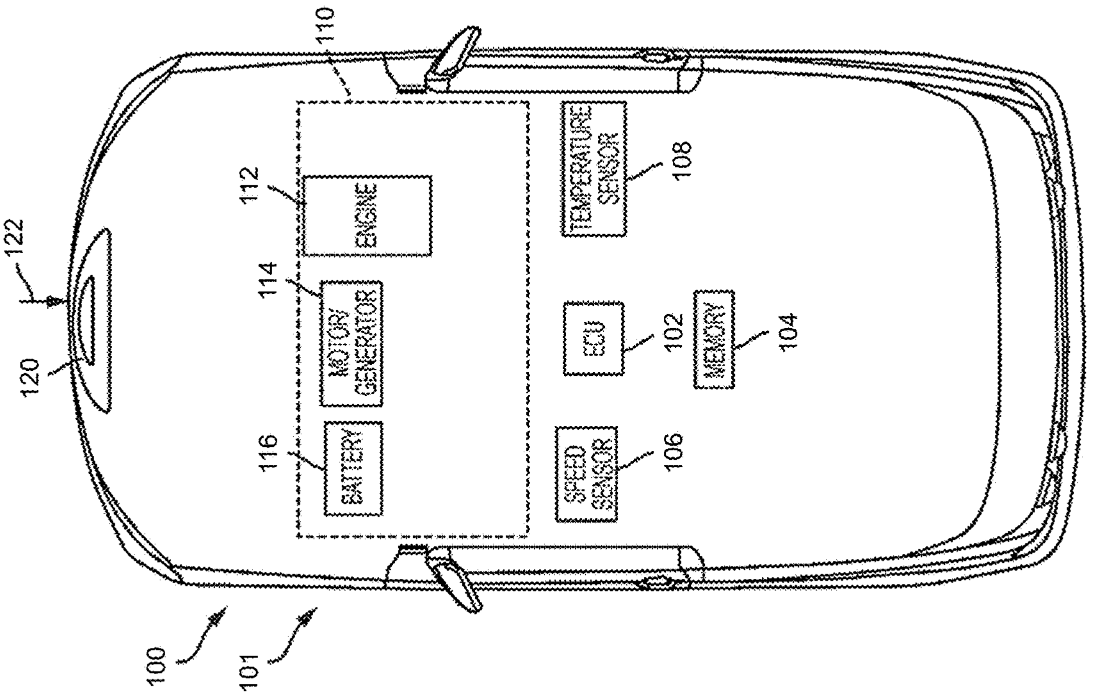
FIG. 1 is a block diagram illustrating various components of a hybrid electric vehicle according to an embodiment of the present invention.

FIG. 1 shows a diagram of a hybrid electric vehicle 100. This vehicle 100 may be a plug-in hybrid electric vehicle (PHEV) or a hybrid electric vehicle (HEV) that may use various other fuel sources including gasoline. The vehicle 100 may include components of a system 101 for powering the vehicle and controlling various components of the vehicle 100. In some implementations, the vehicle 100 and system 101 include an ECU 102, a memory 104, a speed sensor 106, and a temperature sensor 108. The vehicle 100 further includes a power source 110 which may include at least one of an engine 112, a motor-generator 114, and a battery 116.

The ECU 102 may be coupled to each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations. In that regard, the ECU 102 may control various aspects of the system 101 as well as well as aspects of the vehicle itself (such as steering, braking, accelerating, or the like).

The memory 104 may include any non-transitory memory known in the art. In that regard, the memory 104 may store machine-readable instructions usable by the ECU 102 and may store other data as requested by the ECU 102.

The speed sensor 106 may be any speed sensor capable of detecting data usable to determine a speed of the vehicle 100. For example, the speed sensor 106 may include a GPS sensor or an IMU sensor. The speed sensor 106 may also or instead include an angular velocity sensor configured to detect an angular velocity of the wheels of the vehicle 100 or the engine, a speedometer, or the like.

The temperature sensor 108 may include one or more temperature sensor capable of detecting data usable to determine an ambient temperature within a portion of the vehicle 100 or outside of the vehicle 100. For example, the temperature sensor 108 may include a thermocouple, a thermometer, an infrared temperature sensor, a thermistor, or the like.

The engine 112 may convert a fuel into mechanical power. In that regard, the engine 112 may be a gasoline engine, a diesel engine, or the like. The battery 116 may store electrical energy. In some implementations, the battery 116 includes one or more energy storage devices including a battery, a fly-wheel, a super-capacitor, a thermal storage device, or other energy storage devices. The battery 116 may also include a plurality of fuel cells that facilitate a chemical reaction to generate electrical energy.

The motor/generator 114 may convert the electrical energy stored in the battery 116 into mechanical power usable to propel the vehicle. The motor/generator 114 may further convert mechanical power received from the engine 112 or wheels of the vehicle into electricity, which may be stored in the battery 116 as energy and/or used by other components of the vehicle. In some embodiments, the motor-generator 114 may also or instead include a turbine or other device capable of generating thrust.

In some implementation, the battery 116 includes a number of battery cells or modules packaged together with electronics. Examples of a battery 116 type that may be used in electric vehicles include lithium ion and nickel-metal hydride. In some cases, the battery 116 is found to be deficient for use in the vehicle 100. There are many reasons for this, including normal usage over time, electronic failure, thermal events, damage from impacts, corrosion, and other causes. The battery 116 may be tested periodically to determine if any of these failures have occurred. In some implementations, the state-of-health (SOH) of the battery 116 of the measured, which may include various operating parameters of the battery 116, including one or more of capacity, cycle life, voltage range, voltage window, and other operating parameters. In other implementations, the battery 116 is evaluated by other combination of parameters than the SOH. For example, a battery may be deemed useful as a second-life battery if it falls with a target SOH range and has sufficient cycle life and maximum power (amp-hours) to provide power to a tractor. The individual battery cells of the battery 116 may also be tested to determine SOH and the other parameters discussed above. If either the battery 116 or an individual battery cell is found to be deficient, it may be removed from the vehicle 100 and replaced.

Figure 2:
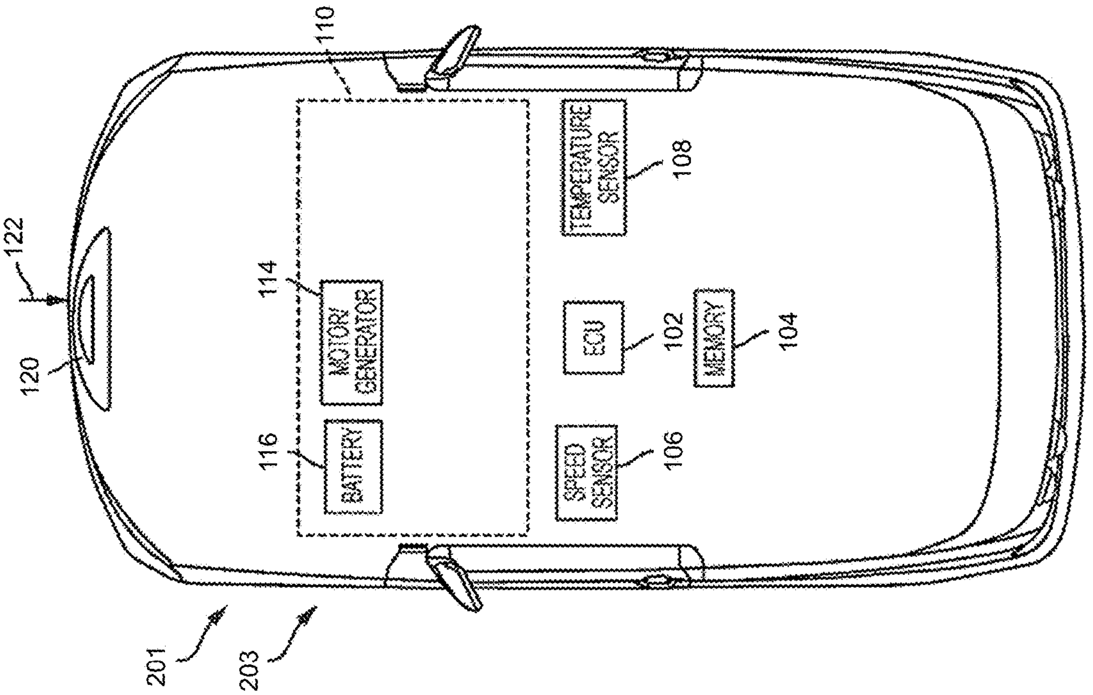
FIG. 2 is a block diagram illustrating various components of a fully battery-powered electric vehicle according to an embodiment of the present invention.

FIG. 2 shows a diagram of a fully battery powered electric vehicle 201 (which may be referred to as an "EV" or "BEV"). This vehicle 201 may include the system 203 shown which may be similar to the system 101 of FIG. 1 without a fuel-driven engine. This vehicle 201 may be powered primarily or entirely by battery power.

Many electric vehicle batteries are simply discarded if they are found to be unsuitable for electronic vehicles for any of the variety of reasons discussed above. However, there is potential for other applications according to the present disclosure. For example, these batteries (such as battery 116) even if found to be unsuitable for electric vehicles, may be used as second-life batteries to provide power to work vehicles such as tractors (and other agricultural vehicles). Second-life batteries may be ideal for these type of applications because the shorter lifespan or range of batteries that makes them unsuitable for use in electric vehicles may be inconsequential for agricultural applications. Further, tractors and other work vehicles may require high amounts of torque and associated electrical power to perform certain maneuvers or to carry out certain tasks. The power from second-life batteries may be used to carry out these tasks or to supplement existing power system on the tractor.

In some implementations, a battery is selected for second-life applications if its SOH falls in a target range. This range may be defined below the minimum acceptable value for electric vehicles but above the minimum acceptable value for agricultural applications. For example, a second-life battery may be selected that has 85% remaining capacity, which falls within a target range of 70% (minimum acceptable value for agricultural applications) to 90% (minimum acceptable value for electric vehicles). In other embodiments, this target range can be 60% to 80%, 25% to 75%, 50% to 70%, 75% to 95%, or other ranges, including down to 25% and up to 95%. The target range can be defined for other parameters, such as amp hours, cycle life, voltage range, voltage window, or other parameters. In other implementations, a battery is selected for a second-life application after an operational failure, such as an electronic failure (for example, without a thermal event). Further, battery cells or individual modules within the battery may be tested and selected for use in a second-life battery. For example, a battery may experience an electronic failure in an electric vehicle. The battery may be disassembled and each battery cell may be separated from the existing electronics in the battery and tested for SOH and other parameters. Battery cells that are found to be suitable for use in a tractor may be repackaged together (such as in a new housing and with new electronics) and used as a second-life battery in this form. In some implementations, multiple second-life batteries may be used together. For example, a single second-life battery may have only 50% remaining capacity. This second-life battery may be combined with another second-life battery having a similar remaining capacity (such as connected in series) to provide power to a tractor roughly equal to a fully functional battery. The use of a second-life battery in this way may maximize the use of multiple batteries that are their own would not be suitable for use on electric vehicles.

Figure 3:
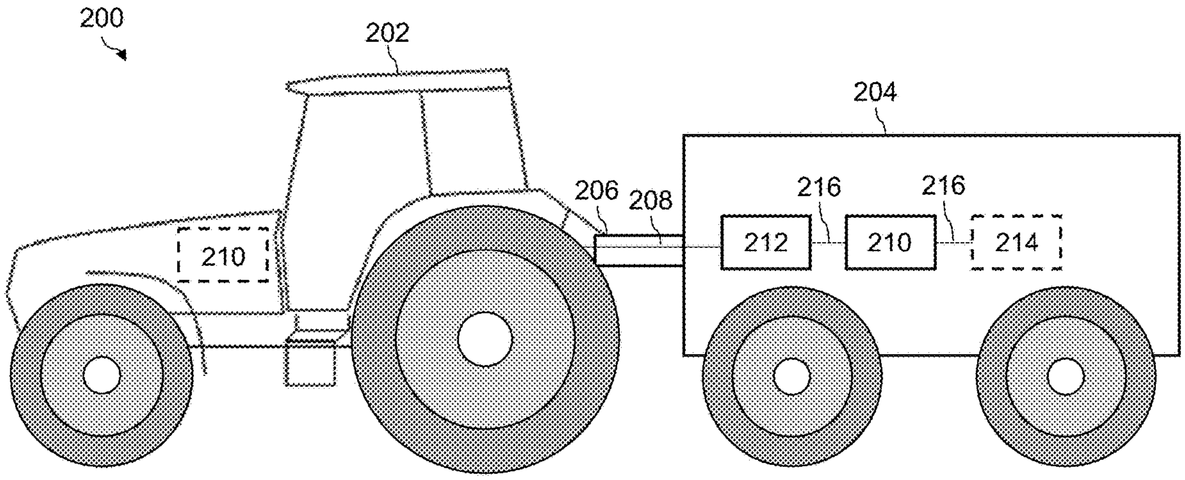
FIG. 3 is a diagram illustrating a second-life battery providing electrical power to a tractor according to embodiments of the present invention.

FIG. 3 shows a diagram 200 illustrating a second life battery 210 providing electrical power to a tractor 202 according to embodiments of the present invention. The second-life battery 210 in FIG. 3 may be similar to battery 116 in FIGS. 1 and 2 that is originally used in an electric vehicle but fails one or more operating parameters. The tractor 202 may be an electric or hybrid-electric tractor. In some implementations, the second-life battery 210 is used as a primary power source for electric tractors, and as a secondary power source for hybrid-electric tractors (such as to provide additional power for steering, certain maneuvers, to increase range, or for heavy loads, etc.). In other implementations, the second-life battery 210 is used with other power sources in both hybrid and hybrid-electric tractors, such as to supplement existing power supplies.

The second-life battery 210 may have been tested and found to be unsuitable for use in electric vehicles but suitable for use with the tractor 202 (such as falling within the target range as discussed above). The second-life battery 210 may be used to power the tractor 202 in a variety of ways. For example, the second-life battery 210 may replace the traditional engine in the tractor 202. The battery 210 may be directly connected to the tractor 202. In the example of FIG. 3, the second-life battery 210 is placed on a trailer 204 which may be connected to the tractor 202 (for example by a hitch 206). In some implementations, the second-life battery 210 uses existing electrical connections on the trailer 204 to maximize power and simplify packaging/form factor requirements. The second-life battery 210 may be connected to electronics 212 such as a controller. The second-life battery 210 may also be connected to the tractor 202 through and electrical connection 208 (which may pass through the hitch 206 or other connection between the tractor 202 and trailer 204). Optionally, one or more other second-life batteries 214 are positioned on the trailer 204 and connected to the second-life battery 210. In this way, an array of second-life batteries may be used to provide electrical power to the tractor 202. The trailer 204 may provide the advantage of being able to incorporate second-life batteries 210 easily without requiring the rearrangement of batteries and electronics on the tractor 202. In some implementations, the trailer 204 may also be easily connected and disconnected from the tractor 202 without requiring time for charging (such as during an agricultural procedure requiring more battery power than available from a single trailer).

Optionally, a second-life battery 210 may be integrated directly into the tractor 202, such as replacing the standard primary use battery. A second-life battery 210 used in this way may be used with a trailer 204 and associated second-life battery 210, or may be used without a trailer 204. In any case, the second-life battery 210 may be used as a primary power source for the tractor 202 or as a secondary power source such as a backup power supply or to provide additional power for increase range, certain maneuvers, heavy loads, etc.

Figure 4:
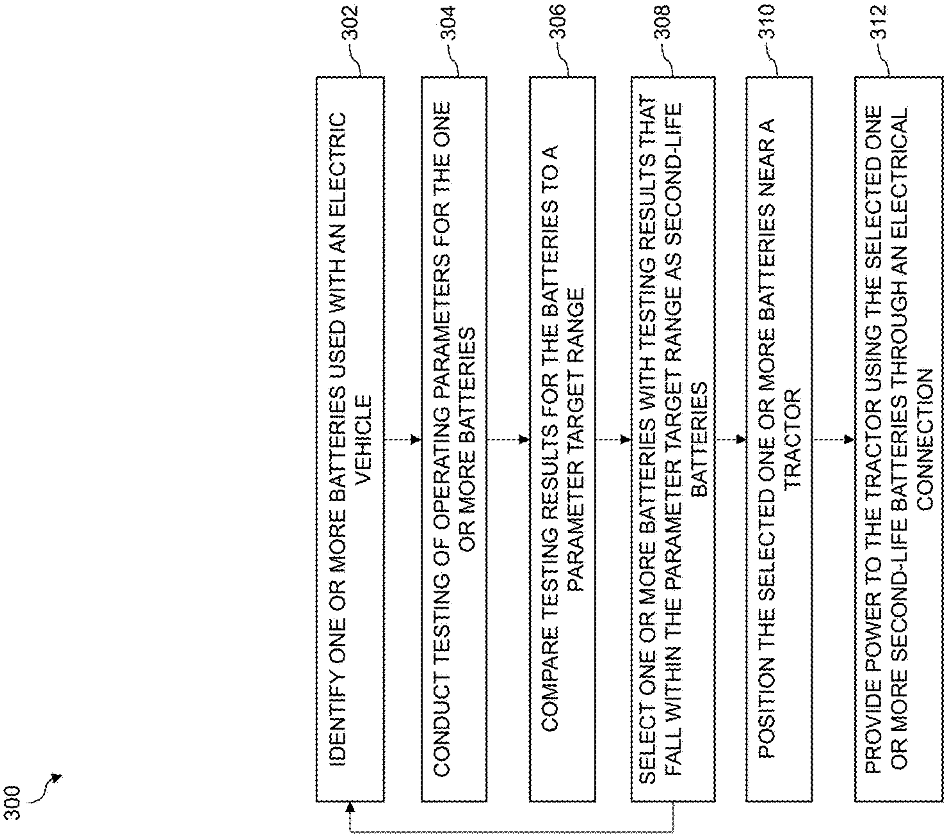
FIG. 4 is a flowchart illustrating a method for providing electrical power to a tractor with a second-life battery.

FIG. 4 shows a method 300 for providing power to a tractor with a second-life battery, such as second-life battery 210 shown in FIG. 3. The method 300 may include block 302 to identify one or more batteries used with an electric vehicle. These batteries may be used as a primary or secondary power source in an electric vehicle.

In block 304, the method 300 may include conducting testing of operating parameters for the one or more batteries. These operation parameters may include SOH, capacity, cycle life, voltage range voltage window, temperature, and other operating parameters. The testing may take into account the length of time that a battery has been used in an electric vehicle, as well as total life span. The testing may also include functional testing such as measuring output levels from a battery during use or measuring the temperature of battery components. Testing may occur after a failure (such an electronic failure or thermal even) or may be regularly at certain intervals over time.

In block 306, the method 300 may include comparing the testing results from block 304 to a parameter target range. This target range may be similar to the target range discussed above, and in particular, may represent an acceptable operational range for use with a tractor. In some implementations, the range is bounded by a minimum acceptable value for electric vehicles and a minimum acceptable value for use with a tractor.

In block 308, the method 300 may include selecting one or more batteries with testing results that fall within the parameter target range as second-life batteries. These batteries or battery cells may be removed from the electric vehicle at this block (or at earlier blocks, such as before testing) and may be repackaged as necessary to prepare them for use with a tractor. If no batteries are found to have testing results that fall within the target range, the method 300 may continue to block 302 and start over.

In block 310, the method 300 may include positioning the selected one or more batteries on or near a tractor. As shown in FIG. 3, this block 310 may include positioning the batteries on a trailer connected to the tractor or on the tractor itself. The selected one or more batteries may be connected to the tractor with electrical connections. In some implementations, the selected batteries are connected to the tractor using existing wiring, as this may simplify the integration of the second-life batteries. The selected second-life batteries may be connected together in an array to provide power to the tractor at this block 310.

At block 312, the method 300 may include providing power to the tractor using the selected one or more second-life batteries through an electrical connection. As discussed above, these second-life batteries may be used as a primary or secondary power source. Testing may occur in block 312 to ensure that acceptable power levels are provided by the selected second-life batteries.

Figure 5:
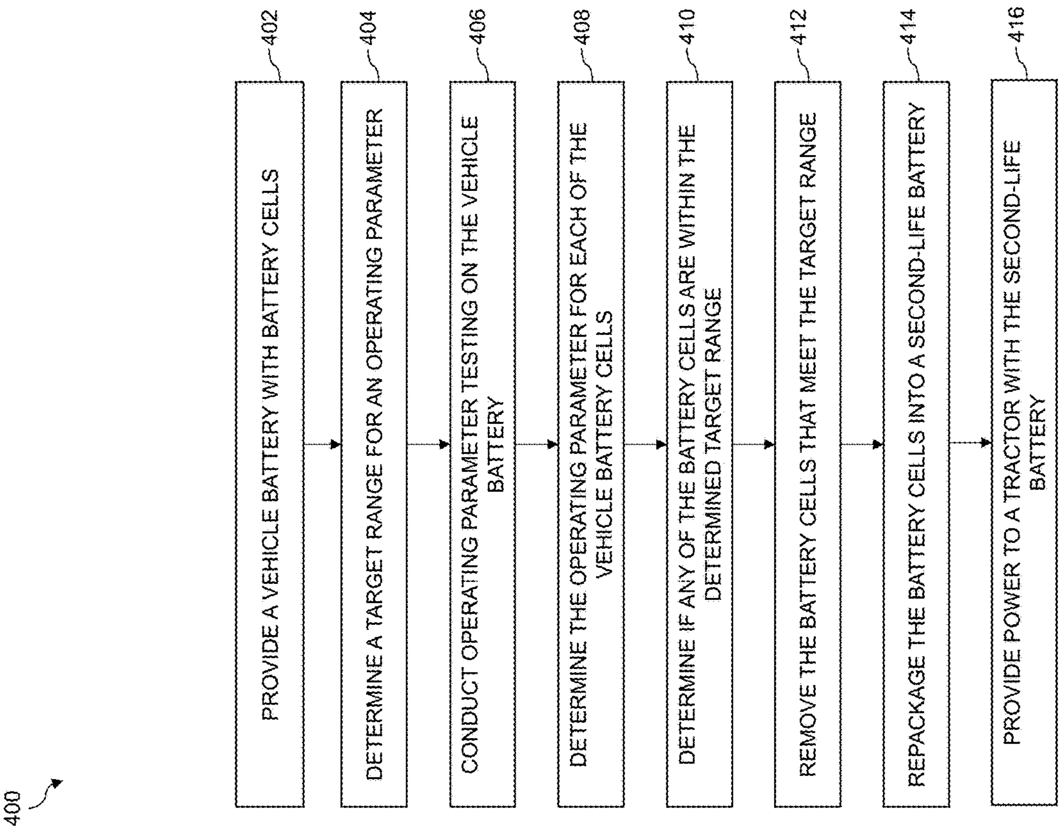
FIG. 5 is a flowchart illustrating a method for providing a second-life battery for use with a tractor.

FIG. 5 shows a method 400 for providing a second-life battery for use with a tractor, such as second-life battery 210 shown in FIG. 3. The method 400 may include block 402 to provide a vehicle battery with battery cells. This battery may be used as a primary or secondary power source in an electric vehicle.

In block 404, the method 400 may determining a target range for a battery operating parameter. This parameter can be any of SOH, capacity, cycle life, voltage range voltage window, temperature, and other operating parameters, as well as combinations of these parameters. The target range may be similar to the target range discussed above, and in particular, may represent an acceptable operational range for use with a tractor. In some implementations, the range is bounded by a minimum acceptable value for electric vehicles and a minimum acceptable value for use with a tractor.

In block 406, the method 400 may include conducting testing of the operational parameter of the vehicle battery. The testing may take into account the length of time that a battery has been used in an electric vehicle, as well as total life span. The testing may also include functional testing such as measuring output levels from a battery during use or measuring the temperature of battery components. Testing may occur after a failure (such an electronic failure or thermal even) or may be regularly at certain intervals over time.

In block 408, the method 400 may include determining the operating parameter for each of the vehicle battery cells of the battery according to the testing in block 406. In some implementations, each battery cell is tested individually to determine operating parameters. In block 410, the method 400 may include determining if any of the battery cells have a testing result that is within the determined target range. This block 408 may include rejecting some battery cells even if they fall within the target range, if for example, they are from a battery that underwent a thermal event and may be compromised.

In block 412, the method 400 may include removing any battery cells that have been determined to fall within the target range in block 410. In some implementations, this block 412 may include disassembling the battery and discarding battery cells that do not fall within the target range. The electronics of the battery may also be removed in this block 412.

In block 414, the method 400 may include repackaging the selected battery cells into a second-life battery. In some implementations, the selected battery cells may be repackaged with other battery cells removed from other electric vehicle batteries. In other implementations, the selected battery cells are combined with new battery cells. New electronics may be added to the repackaged battery cells, as well as a new housing for the battery. In some implementations, the second-life battery has the same form factor as the original electric vehicle battery. In other implementations, another form factor is chosen for the second-life battery, such as a custom enclosure with more battery cells than the original battery.

In block 416, the method 400 may include providing power to a tractor with the second-life battery. As discussed above, this block 416 may include connecting the second-life battery to electronics and establishing an electrical connection to the tractor. The repackaged second-life battery may be integrated directly into the tractor or on a trailer connected to the tractor.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A method for providing power for a tractor, comprising:
selecting a second-life battery by:
providing a plurality of vehicle batteries;
conducting a state-of-health (SOH) test on each of the plurality of vehicle batteries;
comparing a SOH result value for each of the SOH tests to a target SOH range, the target SOH range being below a predetermined minimum SOH value for powering an electric vehicle and above a predetermined minimum SOH value for powering a tractor; and selecting a first second-life battery of the plurality of vehicle batteries with a SOH result being within the target SOH range;

positioning the first second-life battery near a tractor; and providing power to the tractor from the first second-life battery through an electrical connection.

2. The method of claim 1, further comprising positioning the first second-life battery on a trailer that is electrically connected to the tractor.

3. The method of claim 1, further comprising selecting a second second-life battery of the plurality of vehicle batteries with a SOH result being within the target SOH range.

4. The method of claim 3, further comprising positioning the second second-life battery near the tractor and electrically connected to the first second-life battery; and providing power to the tractor from the second second-life battery through the electrical connection.

5. The method of claim 4, further comprising positioning the first second-life battery and the second second-life battery on a trailer that is electrically connected to the tractor.

6. The method of claim 1, wherein the tractor is a fully electric tractor or a hybrid-electric tractor.

7. The method of claim 1, further comprising:

selecting a second second-life battery of the plurality of vehicle batteries with a SOH result being within the target SOH range;

electrically connecting the first second-life battery and the second second-life battery; and providing power to the tractor from the first second-life battery and the second second-life battery through the electrical connection.

8. The method of claim 1, wherein providing power to the tractor from the first second-life battery through an electrical connection is in addition to another power supply being used on the tractor.

9. A system for providing power to a tractor with a second-life battery, comprising:

a testing system configured to:

define a target state-of-health (SOH) range, the target SOH range being below a predetermined minimum SOH value for powering an electric vehicle and above a predetermined minimum SOH value for powering a tractor;

conduct SOH testing on a plurality of second-life batteries previously used on electric vehicles;

select a first second-life battery from the plurality of second-life batteries that meets the target SOH range; and a trailer configured to hold the selected first second-life battery, the trailer having an electrical connection to the tractor to provide power from the selected first second-life battery to the tractor.

10. The system of claim 9, wherein the testing system is further configured to select a second second-life battery from the plurality of second-life batteries that meets the target SOH range.

11. The system of claim 10, wherein the trailer is configured to provide power to the tractor from the second second-life battery through the electrical connection.

12. The system of claim 9, wherein the tractor is a fully electric tractor.

13. The system of claim 9, wherein the tractor is a hybrid-electric tractor.

14. The system of claim 9, wherein the trailer is configured to provide power from the selected first second-life battery to the tractor through the electrical connection in addition to another power supply being used on the tractor.

15. The system of claim 9, wherein the target SOH range has an upper limit of 90% and a lower limit of 70% of normal operating battery health.

16. The system of claim 9, wherein the target SOH range has an upper limit of 95% and a lower limit of 60% of normal operating battery health.

17. The system of claim 9, wherein the second-life battery is a lithium ion battery.

18. The system of claim 9, wherein the second-life battery is a nickel-metal hydride battery.

19. A method for providing a second-life battery for use with a tractor, comprising:

providing a vehicle battery comprising a plurality of battery cells;

determining a target state-of-health (SOH) range, the target SOH range having as a lower limit a predetermined minimum SOH value for powering a tractor and having as an upper limit a predetermined minimum SOH value for powering an electric vehicle;

conducting a SOH test on each of the plurality of battery cells;

comparing a SOH result value for each of the SOH tests to the target SOH range;

selecting one or more battery cells with a SOH result value that falls within the target SOH range;

removing the selected one or more battery cells from the vehicle battery;

repackaging the selected one or more battery cells in a second-life battery; and using the second-life battery to provide power to a tractor.

20. The method of claim 19, wherein the target SOH range has an upper limit of 90% and a lower limit of 70% of normal operating battery health.

* * * * *